United States Patent [19]

Baba et al.

[11] Patent Number: 4,593,953
[45] Date of Patent: Jun. 10, 1986

[54] APPARATUS FOR COVERING DISC WHEEL FOR MOTOR VEHICLE

[75] Inventors: Takeshi Baba, Kasugai; Hiroki Iwasa, Aichi; Kyozo Ohmi, Anjyo, all of Japan

[73] Assignee: Kabushiki-Kaisha Tokai-Rika-Denki-Seisakusho, Aichi, Japan

[21] Appl. No.: 679,945

[22] Filed: Dec. 10, 1984

[30] Foreign Application Priority Data

Dec. 14, 1983 [JP] Japan ............................ 58-192793[U]
Oct. 22, 1984 [JP] Japan ............................ 59-159897[U]

[51] Int. Cl.$^4$ ........................ B60B 7/04; B60B 19/10
[52] U.S. Cl. ................................ 301/6 CS; 301/37 R
[58] Field of Search ................ 301/6 CS, 6 CF, 37 R; 188/71.6

[56] References Cited

U.S. PATENT DOCUMENTS 2,646,862 7/1953 Dodge .............................. 301/6 CS
3,168,348 2/1965 Fleming et al. .................. 301/6 CS Primary Examiner—David A. Scherbel
Attorney, Agent, or Firm—Parkhurst & Oliff

[57] ABSTRACT

An apparatus for covering a disc wheel supporting a tire for a motor vehicle has a wheel cover mounted on the disc wheel and covering an outer side of the disc wheel, and at least one ventilation opening in the wheel cover for communicating the inside of the wheel cover with the atmosphere. The apparatus is provided with a closing plate for closing the ventilation opening when a temperature inside the wheel cover is not more than a predetermined temperature and opening the ventilation opening when the temperature inside the wheel cover is more than the predetermined temperature. A heat sensing member, which may be made of a shape memory effect alloy is connected to the closing plate and deforms when the temperature inside the wheel cover is more than the predetermined temperature so as to displace the closing plate away from the opening to open the opening.

15 Claims, 25 Drawing Figures

4,593,953

APPARATUS FOR COVERING DISC WHEEL FOR MOTOR VEHICLE

BACKGROUND OF THE INVENTION

1. Field of the Invention

The present invention relates to an apparatus for covering a disc wheel for use in a motor vehicle, and more particularly to a wheel cover mounted on the disc wheel, which is placed on the outermost side of a wheel of the motor vehicle.

2. Description of the Prior Art

The disc wheel of the motor vehicle such as an automobile is disposed adjacent a brake device and thus receives heat through heat transfer which occurs in a disc rotor or brake drum of the brake device while braking. The conventional disc wheel, therefore, is constructed so as to discharge such heat to the atmosphere. However, the wheel cover mounted on the disc wheel has been recently made of plastics, which have a low heat transfer characteristic. Therefore, the wheel cover is provided with openings for ventilation, through which the heat is to be discharged to the atmosphere.

Since the wheel cover is mounted on the outermost side of the wheel of the vehicle, the openings in the wheel cover cause a considerable air resistance for the vehicle being running, especially at a high speed. Further, there is a fact that in case the vehicle is running at a high speed, especially on a so-called highway, the heat discharging performance from the wheel cover is not so necessitated as on a regular busy road, since the braking is not so often made on the highway.

SUMMARY OF THE INVENTION

Accordingly, an object of the present invention is to provide a unique apparatus for covering a disc wheel for a motor vehicle, in which openings for ventilation of a wheel cover are opened only when a temperature inside the wheel cover is high so that heat inside the wheel cover will be discharged to the atmosphere and closed when the temperature inside the wheel cover is low so that air resistance for the vehicle being running is kept low.

In order to accomplish the above object, the apparatus for covering the disc wheel for a motor vehicle according to the present invention, which has a wheel cover mounted on the disc wheel and covering an outer side of the disc wheel, and at least one ventilation opening in the wheel cover for communicating the inside of the wheel cover with the atmosphere, is provided with a means for closing the ventilation opening when a temperature inside the wheel cover is not more than a predetermined temperature and opening the ventilation opening when the temperature inside the wheel cover is more than the predetermined temperature.

The means for closing and opening the ventilation opening may include a closing plate for closing the ventilation opening and a heat sensing means or member connected to the closing plate for deforming when the temperature inside the wheel cover is more than the predetermined temperature so as to displace the closing plate away from the opening to open the opening.

The heat sensing member may be made of a shape memory effect alloy.

DESCRIPTION OF THE PREFERRED EMBODIMENT

Preferred embodiments of the invention will be described hereinunder with reference to the accompanying drawings.

Figure 1:
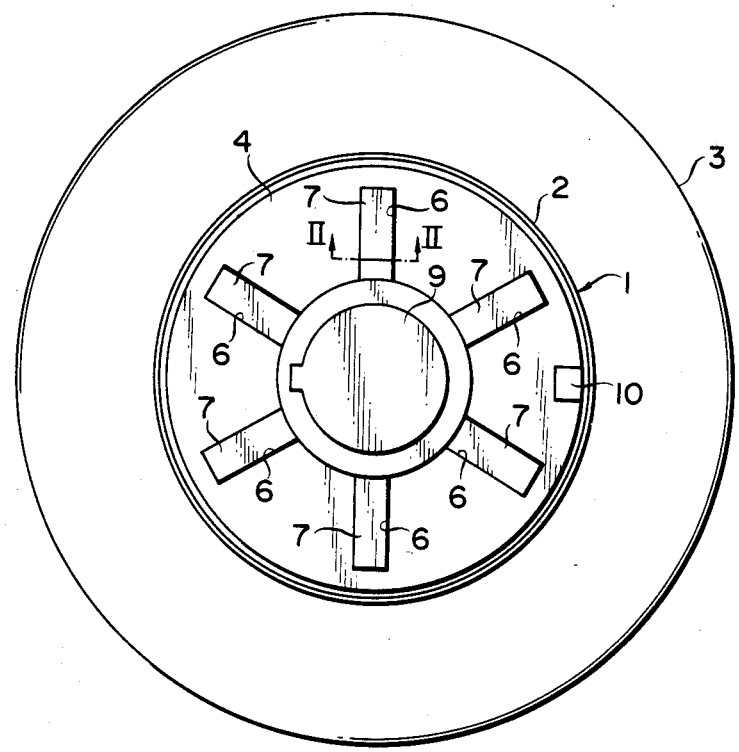
FIG. 1 is a front view of a vehicle wheel incorporating a first embodiment of an apparatus for covering a disc wheel according to the present invention.
Figure 2:
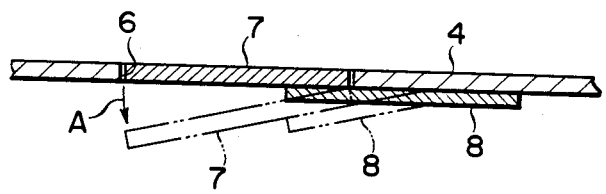
FIG. 2 is a cross-sectional view taken along line II—II of FIG. 1.

Referring first to FIGS. 1 and 2, there is shown a first embodiment of the invention. FIG. 1 shows a front view of a wheel of the vehicle. Reference numeral 1 shows a disc wheel having a rim 2. A tire 3 is mounted on the outer periphery of the rim 2. The disc wheel 1 is, though not shown, fixed onto a wheel axis by bolts and placed adjacent a brake device. A wheel cover 4 for covering the disc wheel 1 is mounted on the outermost side of the disc wheel 1 by means of its peripheral portions (not shown) which are inserted with force into the inner periphery of the rim 2. The wheel cover may be made of, for example, synthetic resin. The wheel cover has a plurality of ventilation openings 6 extending in a radial direction and having substantially a rectangular shape. The openings 6 may be formed six in number as shown in FIG. 1. A closing plate 7 for opening and closing the openings 6 is provided at each of the openings 6. The plate 7 is formed into a rectangular shape so as to be snugly disposed into the openings 6, so that the openings 6 can be closed by the plate 7 as shown in FIG. 2. The plate 7 is supported by a heat sensing member 8 which deforms in response to change of temperature around or inside the wheel cover. The heat sensing member 8 may be made of a shape memory effect alloy, which not only deforms at a predetermined high temperature phase but also returns to its original shape at a low temperature phase. The heat sensing member 8 may alternatively be made of a bimetal. In more detail, one end portion of the heat sensing member 8 is fixed on the bottom surface of the plate 7 and the other end portion thereof is fixed on the bottom surface of the wheel cover 4, so that when the temperature is at the low temperature phase, the heat sensing member 8 keeps flat so as to close the opening 6 by the plate 7 as shown by a solid line in FIG. 2, and when the temperature is at the high temperature phase, the heat sensing member 8 deforms into a substantially bow shape so as to move the plate 7 inwardly of the wheel cover as shown in a direction A and thus open the opening 6 as shown by a phantom line in FIG. 2.

Reference numeral 9 shows a lid detachably mounted on a substantially center of the wheel cover 5 and bolts (not shown) of the disc wheel 1 can be handled when the lid 5 is removed. The wheel cover 4 has another lid 10 mounted for covering an opening to expose an air valve (not shown) of the tire 3 to the outside.

In operation, in case a motor vehicle provided with the wheel cover with the above-described construction is running on a highway, the operation of the brake device is not made so often and thus a friction heat does not occur much from the brake device. Therefore, the disc wheel 1 as well as the wheel cover 4 is kept low in temperature and the heat sensing member 8 keeps flat so as to close the opening 6 by the closing plate 7 as shown in FIG. 2 by a solid line. As a result, air resistance at the surface of the wheel cover while the vehicle runs at a high speed on a highway becomes low, so that aerodynamic characteristic of the vehicle is well-modified.

In case the vehicle runs in a busy traffic such as in a city, the friction heat occurs due to frequent operation of the brake device, which places the wheel cover in the high temperature phase. As a result, the heat sensing member 8 deforms into a substantially bow shape so as to open the opening 6 as shown in FIG. 2 by a phantom line. Therefore, the heat inside the wheel cover 4 will be discharged to the atmosphere through the openings 6, whereby the disc wheel 1 is cooled and the temperature of the brake device is kept low. When the temperature of the cover is lowered into the low temperature phase, the heat sensing member 8 returns to be flat by itself so as to close the opening 6.

Accordingly, the openings 6 are opened only when the heat within the wheel cover is necessitated to be discharged, and closed otherwise so as not to deteriorate the aerodynamic characteristic of the vehicle.

Figure 3:
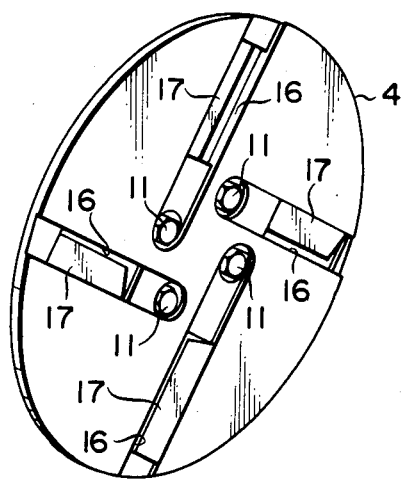
FIG. 3 is a perspective view of a wheel cover showing a second embodiment.

FIG. 3 shows a second embodiment of the present invention in which the placement of the ventilation openings is different from that of the aforesaid first embodiment. Disposed around the center of the wheel cover 4 are four (4) nuts 11 provided for aesthetic purposes and so forth. The wheel cover 4 has four (4) ventilation openings 16 which extend from the nuts 11 to the outer periphery of the wheel cover 4 substantially radially but slightly diagonally. Each of the openings 16 is provided with a closing plate 17 in the same manner as in the aforesaid first embodiment, so that the deformation of the heat sensing member (not shown) causes the opening to be closed or opened by the closing plate 17.

Figure 4:
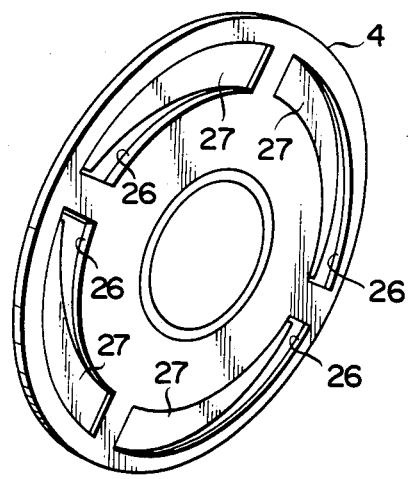
FIG. 4 is a perspective view of a wheel cover showing a third embodiment.

FIG. 4 shows a third embodiment of the present invention, which, like the second embodiment, is different from the first embodiment only with respect to the placement of the ventilation openings. The wheel cover 4 has four (4) ventilation openings 26 at equal intervals extending in a circumferential direction about an axis of the wheel cover 4. Each of the openings 26 is provided with a closing plate 27 in the same manner as in the first embodiment, so that the deformation of the heat sensing member (not shown) causes the opening to be closed or opened by the closing plate 27.

In the above embodiments, the closing plate may alternatively be made of the heat sensing material so that the closing plate can close or open the ventilation opening by itself in accordance with the change of the temperature.

Figure 5:
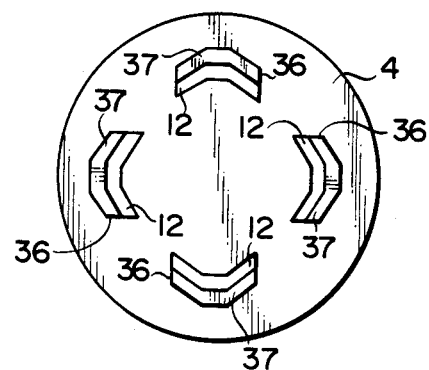
FIG. 5 is a front view of a wheel cover showing a fourth embodiment.
Figure 7:
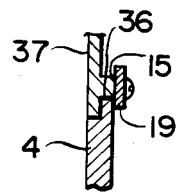
FIG. 7 is a cross-sectional view taken along line VII—VII of FIG. 6.
Figure 6:
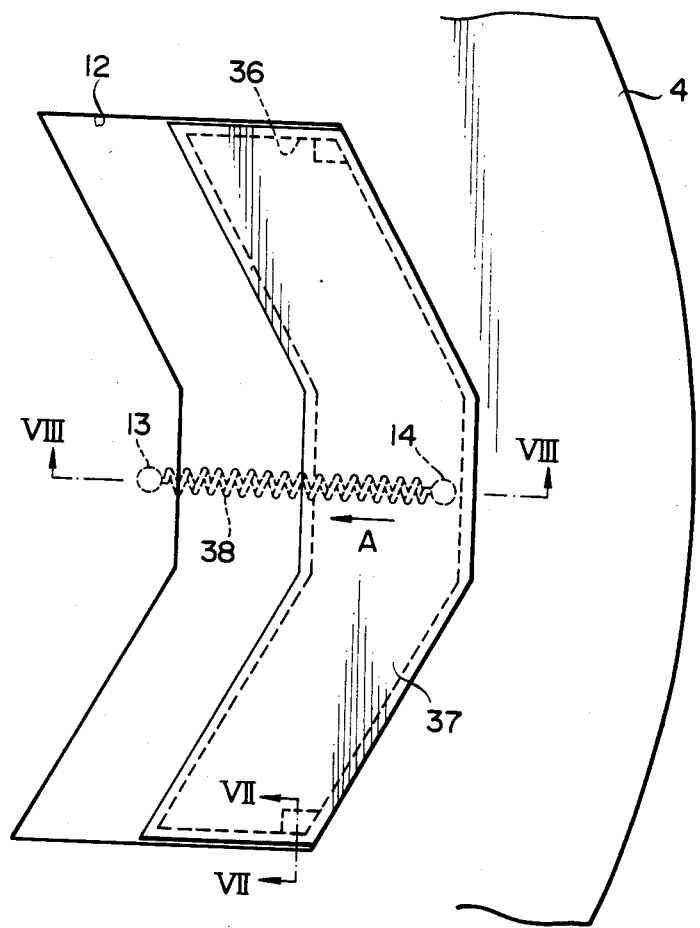
FIG. 6 is an enlarged front view of a ventilation opening when closed in FIG. 5.

FIGS. 5 to 9 shows a fourth embodiment of the present invention. As shown in FIG. 5, the wheel cover 4 has four (4) recesses 12 which extend at equal intervals in a substantially circumferential direction about an axis of the wheel cover. Each of the recesses 12 is formed into an angular shape when viewed in the front elevational view. A ventilation opening 36 is formed within each of the recesses 12 and occupies substantially half of the area of the recess 12. The ventialtion opening 36 is also formed into an angular shape. A closing plate 37 having a commensurate angular shape is slidably coupled into each of the recesses 12, so that the closing plate 37 opens or closes the opening 36 by its sliding movement. In order to guide the sliding movement of the closing plate 37, a support plate 19 is mounted on the bottom of the closing plate 37 through a projection 15 as shown in FIGS. 6 and 7 so as to slidably hold the outer peripheral edge of the opening 36 between the support plate 19 and the body of the closing plate 37.

Figure 8:
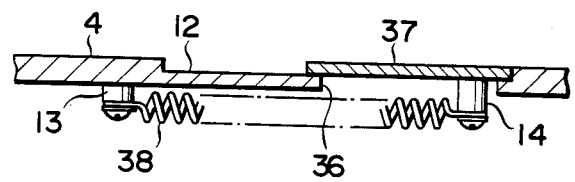
FIG. 8 is a cross-sectional view taken along line VIII—VIII of FIG. 6.
Figure 9:
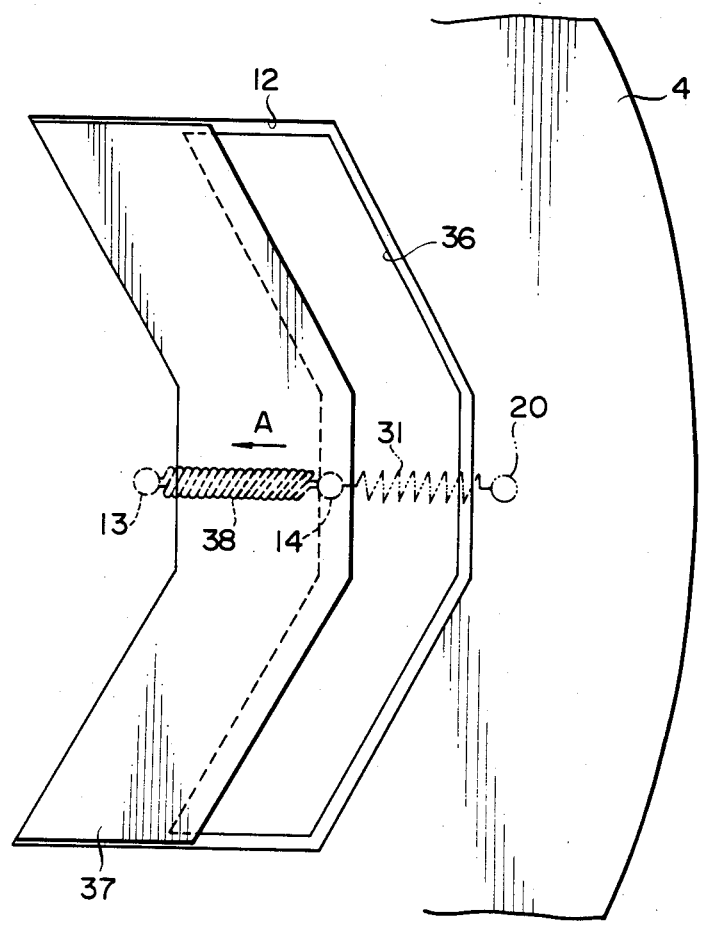
FIG. 9 is an enlarged front view of the ventilation opening when opened.

As shown in FIGS. 6 and 8, the wheel cover has a projection piece 13 projecting from the bottom thereof and a counterpart projection piece 14 projects from the bottom of the closing plate 37. A heat sensing member 38 is interposed between the two projection pieces 13 and 14. The heat sensing member 38, which is formed into a coil in this embodiment may be made of a shape memory effect alloy which is capable of memorizing two different shapes corresponding to low temperature phase and high temperature phase. More specifically, the heat sensing member 38 takes an elongated shape as shown in FIGS. 6 and 8 at a low temperature phase, and takes a shortened shape as shown in FIG. 9 at a high temperature phase.

In operation, when the temperature of the wheel cover 4 is in the low temperature phase as in the highway, the heat sensing member 38 takes the elongated shape so that the closing plate 37 is placed over the opening 36 so as to close the opening 36 as shown in FIGS. 6 and 8. When the temperature of the wheel cover 4 becomes higher into the high temperature phase due to the operation of the brake device and the like, the heat sensing member 38 takes the shortened shape so that the closing plate 37 slides toward the recess 12 as shown by arrow A in FIG. 9 so as to open the opening 36.

As an alternative, the heat sensing member 38 may be capable of memorizing only one shape, for example, the shortened shape at the high temperature phase. In this case, as shown in FIG. 9 by a phantom line, a coil spring 31 is necessarily interposed between the projection piece 14 on the plate 37 and another projection piece 20 on the wheel cover at the opposite side of the opening 36 from the projection piece 13. Accordingly, at the low temperature phase, the coil spring 31 pulls the closing plate 37 against a small resistance by the heat sensing member 38 to close the opening 36, and at the high temperature phase, the heat sensing member 38 pulls the closing plate 37 against the resilient force of the coil spring 31 to open the opening 36.

Figure 10:
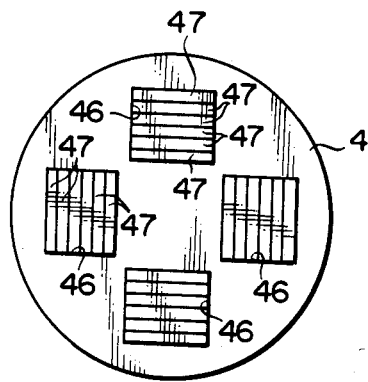
FIG. 10 is a front view of a wheel cover showing a fifth embodiment.

FIGS. 10 to 14 shows a fifth embodiment of the present invention. The wheel cover 4 has four (4) rectangular ventilation openings 46 and each of the openings is provided with a plurality of, for example, six (6) closing plates 47 as shown in FIG. 10. As shown in FIGS. 11 to 14, each of the closing plates 47 has a pair of side plates 23 integrally extending inwardly from both ends of each closing plate 47. Each of the side plates 23 has a hole 23a into which a pin 22 projecting from the peripheral side surface of the opening 46 is inserted, so that each of the closing plates 47 is rotatably supported by the pins 22. Therefore, six (6) of the pins in total are provided on each of the opposed sides of the opening 46.

A link member 29 extends adjacent one of the opposed sides of the opening 46 and has a plurality of second pins 24 corresponding to the number of the closing plates 47, for example six (6) in this embodiment. The second pin 24 projects toward the opening 46 and is inserted through a second hole 23b of the side plate 23 of the closing plate 47. Reference numeral 25 shows a stopper ring for preventing the second pin 24 from falling out of the second hole 23b. The link member 29 has an integral arm 29a extending downwardly in FIG. 11, on which a projection piece 29b is fixed. A pair of projection pieces 20 and 21 are fixed on the inner surface of the wheel cover 4 in such a manner that the projection piece 29b on the link member 29 is disposed between the projection pieces 20 and 21 on the wheel cover 4. A heat sensing member 48 is interposed between one of the projection piece 20 and the projection piece 29b, and a tension coil spring 41 is interposed between the projection piece 29b and the other projection piece 21. The heat sensing member 48 is made of a shape memory effect alloy in a coil shape, which is capable of memorizing one shape at a predetermined high temperature phase in this embodiment. The coil spring 41 is, therefore, provided to bring the heat sensing member 48 back to the original shape at a lower temperature phase. As an alternative, the shape memory effect alloy may be one which is capable of memorizing two shapes corresponding to high and low temperature phases, whereby the coil spring will be unnecessary.

Figure 11:
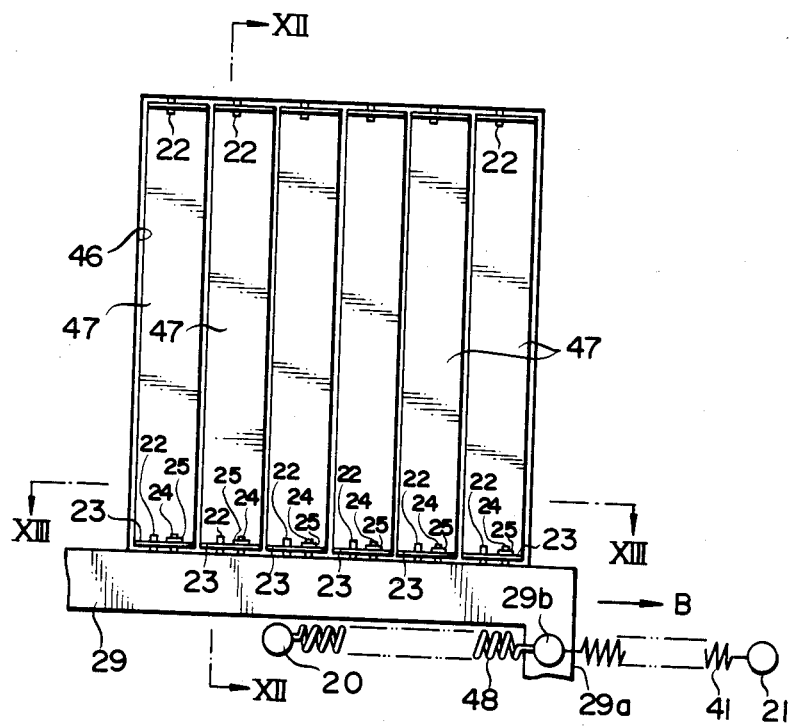
FIG. 11 is an enlarged partial bottom view of the wheel cover at a portion of a ventilation opening in the fifth embodiment.
Figure 12:
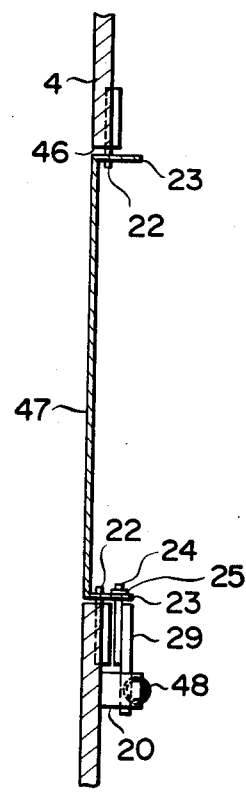
FIG. 12 is a cross-sectional view taken along line XII—XII of FIG. 11.
Figure 13:
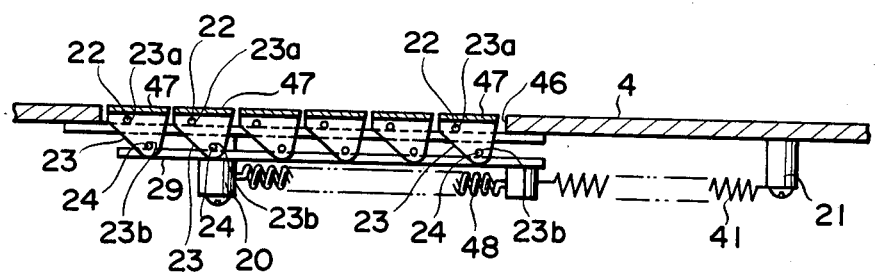
FIG. 13 is a cross-sectional view taken along line XIII—XIII of FIG. 11.
Figure 14:
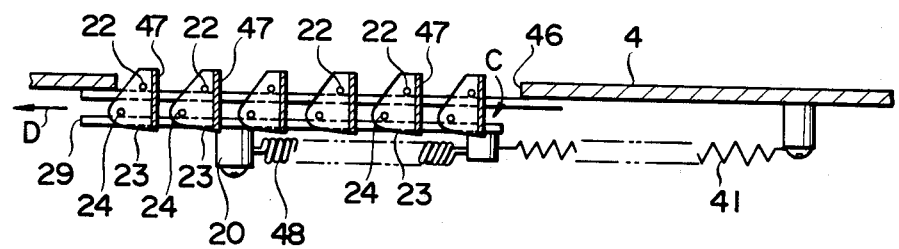
FIG. 14 is a cross-sectional view same as FIG. 13 showing a condition where the ventilation opening is opened.
Figure 15:
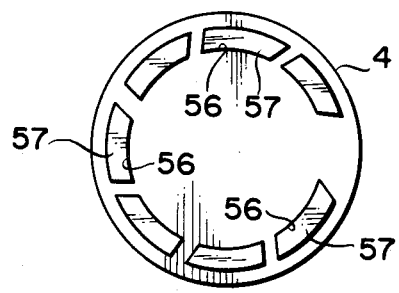
FIG. 15 is a front view of a wheel cover showing a sixth embodiment.

In operation, when the wheel cover 4 is at the low temperature phase, the coil spring 41 pulls the link member 29 in a direction as shown by arrow B in FIG. 11, so that the closing plates 47 are rotated about the pins 22 in a counter-clockwise direction as viewed in FIG. 13 and close the opening 46. When the wheel cover 4 is at the high temperature phase, the heat sensing member 48 takes the shortened memorized shape and pulls the link member 29 in a direction as shown by arrow D in FIG. 14 opposite to arrow B in FIG. 11, so that the closing plates are rotated in a clockwise direction C and open the opening 46.

Figure 16:
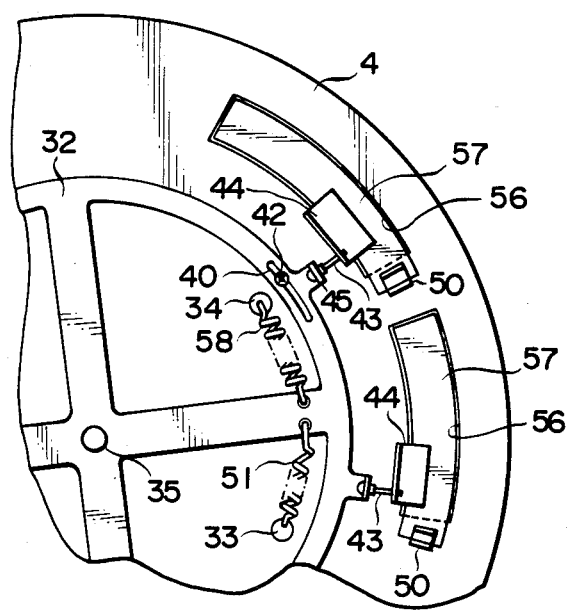
FIG. 16 is an enlarged partial bottom view of the wheel cover of the sixth embodiment.

FIGS. 15 to 19 show a sixth embodiment of the present invention. The wheel cover 4 has a plurality of ventilation openings 56 in a circumferential direction and relatively closer to the outer periphery of the wheel cover 4. As best shown in FIG. 16, which is a bottom view of the wheel cover of this embodiment, a disc frame 32 is rotatably mounted on the bottom surface of the wheel cover 4 by a pin 35. The disc frame 32 is provided with a plurality of integral projections 45 projecting outwardly in a radial direction toward the openings 56. A rod 43 extending also outwardly in a radial direction is fixed on each of the projections 45. The disc frame 32 has a guide hole 40 extending in a circumferential direction, through which a guide screw 42 is loosely inserted and screwed into the wheel cover, so that the rotational movement of the disc frame 32 is securely guided by the hole 40 and the screw 42.

Figure 17:
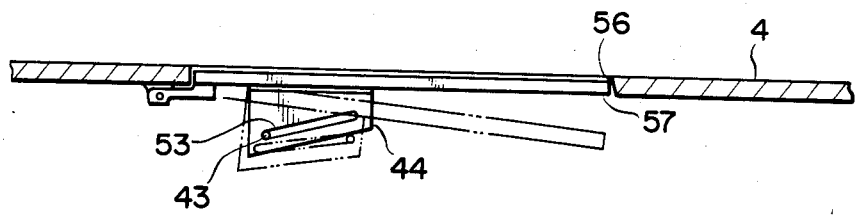
FIG. 17 is an enlarged cross-sectional view showing a closing plate of the sixth embodiment.
Figure 18:
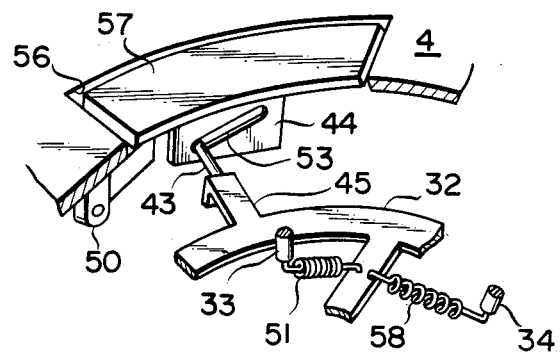
FIG. 18 is a partially cut-away perspective view showing a condition where the closing plate closes the ventilation opening.
Figure 19:
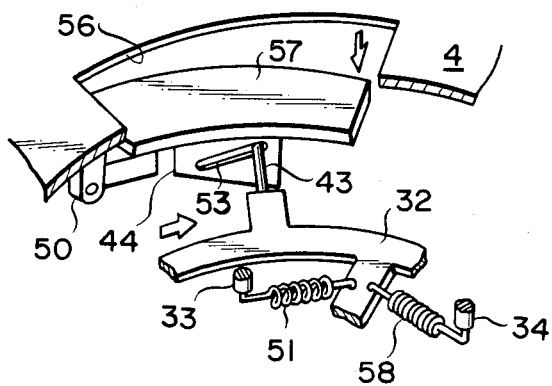
FIG. 19 is a partially cut-away perspective view same as FIG. 18 showing a condition where the ventilation opening is opened.

Each of the openings 56 is provided with a closing plate 57, which is pivoted on the bottom surface of the wheel cover 4 by a hinge 50. The closing plate 57 has a cam plate 44 on the bottom surface thereof and facing toward the center of the disc frame 32. The cam plate 44 has a cam hole 53 extending diagonally with respect to the face of the closing plate 57, through which the rod 43 from the disc frame 32 is inserted. The positional relationship between the rod 43 and the cam hole 53 is such that the rod 43 is at the lowermost end of the cam hole 53 as shown in FIGS. 17 and 18, the closing plate 57 is horizontal so as to close the opening 56 and when the rod 43 is at the uppermost end of the cam hole 53 as shown in FIGS. 17 and 19, the closing plate 57 is swung about the hinge 50 so as to open the opening 56. It should be noted that the rod 43 is moved in fact in parallel with the face of the wheel cover 4 by the rotational movement of the disc frame 32.

As best shown in FIG. 16, a coil spring 51 is interposed between the disc frame 32 and the bottom surface of the wheel cover 4 and extends in one rotational or circumferential direction of the disc frame 32. A heat sensing member 58 in a coil shape as used in the aforementioned embodiments is also interposed between the disc frame 32 and the bottom surface of the wheel cover 4 and extends in the other rotational or circumferential direction of the disc frame 32. Reference numerals 33 and 34 show projections from the bottom surface of the wheel cover 4. The heat sensing member 58 takes a shortened shape at a high temperature phase so as to rotate the disc frame and thus the rod 43 into the uppermost end of the cam hole 53 as shown in FIG. 19 and looses the shortened shape at a low temperature phase so that the coil spring 51 rotates the disc frame 32 and the rod 43 into the lowermost end of the cam hole 53 as shown in FIG. 18.

In operation, when the temperature inside the wheel cover 4 is at the low temperature phase, the coil spring 51 pulls and rotates the disc frame 32 so as to place the rod 43 at the lowermost end of the cam hole 53 or left end thereof as shown in FIG. 17 by a solid line and in FIG. 18, so that the closing plate 57 closes the opening 56.

When the temperature inside the wheel cover 4 is at the high temperature phase, the heat sensing member 58 takes the memorized shortened shape in order to pull and rotate the disc frame 32 in the opposite direction, overcoming a resilient force of the coil spring 51. As a result, the rod 43 is moved into the uppermost end of the cam hole 53 or right end thereof as shown in FIG. 17 by a phantom line and 19, so that the closing plate 57 pivots about the hinge 50 to open the opening 56.

Figure 20:
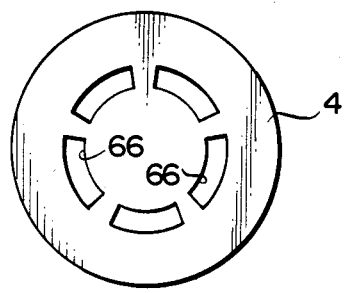
FIG. 20 is a front view of a wheel cover showing a seventh embodiment.
Figure 21:
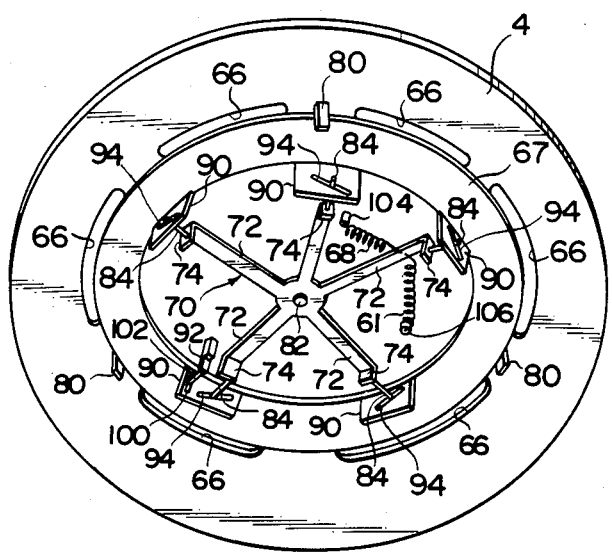
FIG. 21 is a perspective view showing the bottom side of the wheel cover of the seventh embodiment.

FIGS. 20 to 25 show a seventh embodiment of the present invention, which is operationally similar to the sixth embodiment. The wheel cover 4 has a plurality of ventilation openings 66 in a circumferential direction closer the center of the wheel cover 4 as shown in FIG. 20. As shown in FIG. 21, a spoke member 70 having a plurality of radially extending arms 72 is rotatably supported on the bottom surface of the wheel cover 4 by a pin 82. Each of the arms 72 has a bent end 74, from which a rod 84 projects outwardly in a radial direction.

Figure 22:
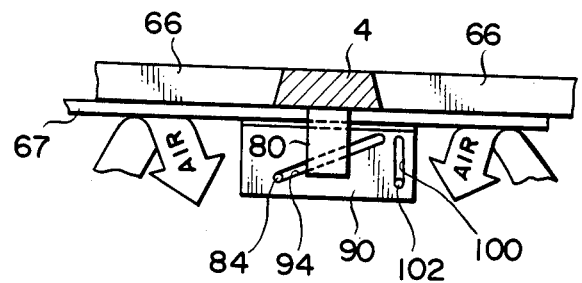
FIG. 22 is a cross-sectional view showing a closing plate when closing the ventilation opening in the seventh embodiment.
Figure 23:
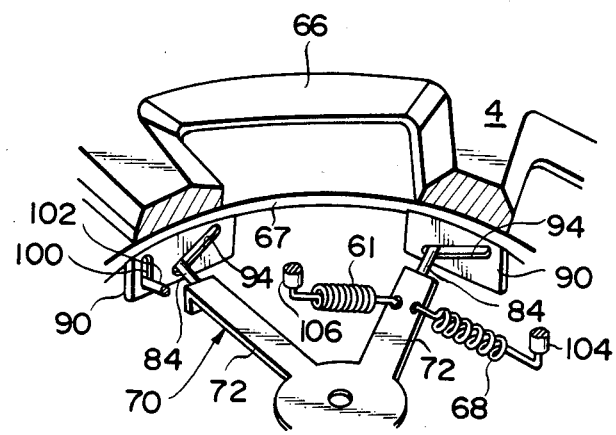
FIG. 23 is a partially cut-away perspective view showing a condition where the ventilation opening is closed in the seventh embodiment.
Figure 24:
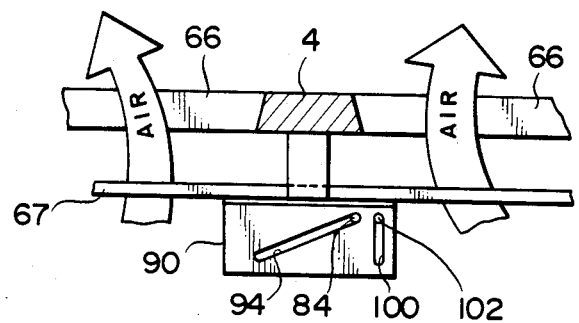
FIG. 24 is a cross-sectional view showing a closing plate when opening the ventilation opening in the seventh embodiment.
Figure 25:
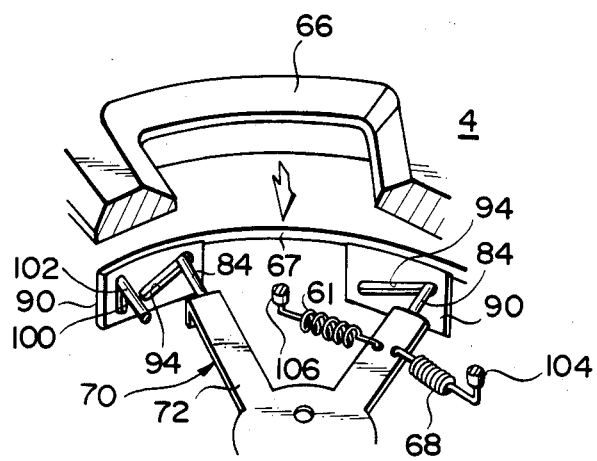
FIG. 25 is a partially cut-away perspective view showing a condition where the ventilation opening is opened in the seventh embodiment.

Unlike the previously described embodiments, a single closing plate 67, which is formed into a ring is provided in this embodiment in order to open or close the plurality of openings 66. The ring-shaped closing plate 67 has a plurality of cam plates 90 at the inner peripheral edge thereof facing toward the center of the spoke member 70. Each of the cam plates 90 has a diagonal cam hole 94, through which each of the rods 84 from the spoke member 70 is inserted. The positional relationship between the rod 84 and the cam hole 94 is similar to the previous embodiment, such that when the rod 84 is at the lowermost end of the cam hole 94 as shown in FIGS. 22 and 23, the closing plate 67 is raised so as to close all the openings 66, and when the rod 84 is at the uppermost end of the cam hole 94 as shown in FIGS. 24 and 25, the closing plate 67 is lowered so as to open all the openings 66.

As best shown in FIG. 21, a coil spring 61 is interposed between one of the arms 72 of the spoke member 70 and the bottom surface of the wheel cover 4. A heat sensing member 68 in a coil shape as used in the aforementioned embodiments is also interposed between the same one of the arms 72 and the bottom surface of the wheel cover 4. Reference numerals 104 and 106 show projections from the bottom surface of the wheel cover 4 for holding one end of the heat sensing member 68 and coil spring 61, respectively. The relative function between the heat sensing member 68 and coil spring 61 is the same as that in the previous embodiment.

One of the cam plates 90 is also provided with a guide hole 100 extending vertically with respect to the face of the closing plate 67. Inserted through the guide hole 100 is a guide bar 102, which projects outwardly in a radial direction from a base member 92 fixed on the bottom surface of the wheel cover 4, so that the closing plate 67 is prevented from any rotation while allowed to move vertically.

Reference numeral 80 shows a support projection extending downwardly from the bottom surface of the wheel cover 4. Three (3) of the support projections 80 are provided so as to keep the closing plate 67 at a predetermined position and guide the vertical movement of the closing plate 67.

In operation, when the temperature inside the wheel cover 4 is at the low temperature phase, the coil spring 61 pulls and rotates the spoke member 70 so as to place the rod 84 at the lowermost end of the cam hole 94 or left end thereof as shown in FIGS. 22 and 23, so that the closing plate 67 is raised and closes the openings 66. The air inside the wheel cover 4 will not be discharged as shown in FIG. 22. When the temperature inside the wheel cover 4 is at the high temperature phase, the heat sensing member 68 takes the memorized shortened shape to pull and rotate the spoke member 70 in the opposite direction, overcoming a resilient force of the coil spring 61. As a result, the rod 84 is moved into the uppermost end of the cam hole 94 or right end thereof as shown in FIGS. 24 and 25, so that the closing plate 67 is lowered to open the openings 66. Accordingly, heated air will be discharged through the openings 66.

What is claimed is:

1. An apparatus for covering a disc wheel supporting a tire for a motor vehicle comprising:
    a wheel cover mounted on said disc wheel and covering an outer side of said disc wheel;
    at least one ventilation opening in said wheel cover for communicating the inside of said wheel cover with the atmosphere; and
    means for closing said ventilation opening when a temperature inside said wheel cover is not more than a predetermined temperature and opening said ventilation opening when the temperature inside said wheel cover is more than said predetermined temperature.

2. An apparatus for covering a disc wheel as set forth in claim 1, wherein said closing means comprises:
    a closing plate for closing said ventilation opening; and
    heat sensing means connected to said closing plate for deforming when the temperature inside said wheel cover is more than said predetermined temperature so as to displace said closing plate away from said ventilation opening to open said ventilation opening.

3. An apparatus for covering a disc wheel as set forth in claim 2, wherein said heat sensing means comprises a shape memory effect alloy, which takes a first memorized shape at a temperature not more than said predetermined temperature so as to displace said closing plate toward said ventilation opening to close said ventilation opening and takes a second memorized shape at a temperature more than said predetermined temperature so as to displace said closing plate away from said ventilation opening to open said ventilation opening.

4. An apparatus for covering a disc wheel as set forth in claim 2, wherein said heat sensing means comprises a shape memory effect alloy, which takes one memorized deformed shape at a temperature more than said predetermined temperature so as to displace said closing plate away from said ventilation opening to open said ventilation opening.

5. An apparatus for covering a disc wheel as set forth in claim 4, further comprising a return spring connected to said heat sensing means, said return spring urging said heat sensing means to return its original shape at a temperature not more than said predetermined temperature so as to displace said closing plate toward said ventilation opening to close said ventilation opening.

6. An apparatus for covering a disc wheel as set forth in claim 2, wherein said heat sensing means comprises a bimetal.

7. An apparatus for covering a disc wheel as set forth in claim 1, wherein said closing means comprises:
   a closing plate slidably mounted on said wheel cover so that a sliding movement of said closing plate closes or opens said ventilation opening;
   a heat sensing member in a coil shape interposed between said wheel cover and said closing plate, said heat sensing member being made of a shape memory effect alloy, so that said heat sensing member takes a first memorized length at a temperature more than said predetermined temperature so as to slide said closing plate away from said opening and takes a second memorized length at a temperature not more than said predetermined temperature so as to slide said closing plate toward said opening.

8. An apparatus for covering a disc wheel as set forth in claim 1, wherein said closing means comprises:
   a closing plate slidably mounted on said wheel cover so that a sliding movement of said closing plate closes or opens said ventilation opening;
   a heat sensing member in a coil shape interposed between said wheel cover and said closing plate, said heat sensing member being made of a shape memory effect alloy, so that said heat sensing member takes one memorized length at a temperature more than said predetermined temperature so as to slide said closing plate away from said opening; and
   a coil spring interposed between said wheel cover and said closing plate and urging said closing plate toward said opening, so that said closing plate slides to close said opening by an urging force of said coil spring at a temperature not more than said predetermined temperature.

9. An apparatus for covering a disc wheel as set forth in claim 1, wherein said closing means comprises:
   a plurality of closing plates across said ventilation opening and rotatably journaled by a plurality of first axes on a periphery of said ventilation opening, said closing plates closing said opening when said closing plate are aligned to be flat and opening said opening when said closing plates are rotated to be perpendicular to said wheel cover;
   a link bar extending and movable along one side of said opening, said link bar connected to each of said closing plates by each of second axes separate from said first axes, so that said closing plates are rotated about said first axes when said link bar moves along said one side of said opening;
   a heat sensing member in a coil shape interposed between said wheel cover and said link bar, said heat sensing member being made of a shape memory effect alloy, so that said heat sensing member takes one memorized length at a temperature more than said predetermined temperature so as to move said link bar and rotate said closing plates to be perpendicular to the wheel cover; and
   a coil spring interposed between said wheel cover and said link bar and urging said link bar against a moving force of said heat sensing member, so that said link bar is moved against said moving force of said heat sensing member by an urging force of said coil spring at a temperature not more than said predetermined temperature so as to rotate said closing plate to be aligned flat.

10. An apparatus for covering a disc wheel as set forth in claim 1, wherein said closing means comprises:
    a closing plate for closing said ventilation opening;
    a cam plate fixed to said closing plate and having a guide extending diagonally with respect to said closing plate;
    a cam driving member supported on said wheel cover movably in a direction parallel with said wheel cover and coupled into said guide of said cam plate, whereby said closing plate together with said cam plate is displaced to open said opening as said cam driving member moves;
    a heat sensing member in a coil shape interposed between said wheel cover and said cam driving member, said heat sensing member being made of a shape memory effect alloy, so that said heat sensing member takes one memorized length at a temperature more than said predetermined temperature so as to move said cam driving member in a direction to displace said closing plate to open said opening; and
    a coil spring interposed between said wheel cover and said cam driving member and urging said cam driving member against a moving force of said heat sensing member, so that said cam driving member is moved against said moving force of said heat sensing member by an urging force of said coil spring at a temperature not more than said predetermined temperature so as to displace said closing plate to close said opening.

11. An apparatus for covering a disc wheel as set forth in claim 10, wherein said cam driving member comprises:
    a disc rotor rotatably supported at a center of said wheel cover, said disc rotor connected with said heat sensing member and said coil spring; and
    a cam driving rod extending outwardly in a radial direction and coupled into said guide of said cam plate.

12. An apparatus for covering a disc wheel as set forth in claim 11, wherein said guide of said cam plate is a hole extending on said cam plate.

13. An apparatus for covering a disc wheel as set forth in claim 11, wherein said closing plate is provided for each of said at least one ventilation opening and hinged on said wheel cover at a peripheral portion of each of said opening.

14. An apparatus for covering a disc wheel as set forth in claim 11, wherein said closing plate is formed into a ring shape adapted to close said at least one ventilation opening disposed along a circumferential direction on said wheel cover, whereby said closing plate approaches said wheel cover to close said opening or departs from said wheel cover to open said opening depending on a moving direction of said cam driving rod.

15. An apparatus for covering a disc wheel as set forth in claim 14, further comprising:
    a second guide on said cam plate extending perpendicular to said closing plate; and
    a guide rod fixed on said wheel cover and coupled into said second guide, whereby an approaching or departing movement of said closing plate is guided by said second guide and said guide rod.

* * * * *